United States Patent
Zhang et al.

(10) Patent No.: US 11,909,070 B2
(45) Date of Patent: Feb. 20, 2024

(54) CERAMIC NANOWIRE BATTERY SEPARATORS

(71) Applicant: Novarials Corporation, Woburn, MA (US)

(72) Inventors: Xinjie Zhang, Winchester, MA (US); Kuiyang Jiang, Winchester, MA (US)

(73) Assignee: Novarials Corporation, Woburn, MA (US)

( * ) Notice: Subject to any disclaimer, the term of this patent is extended or adjusted under 35 U.S.C. 154(b) by 389 days.

(21) Appl. No.: 17/274,376

(22) PCT Filed: Oct. 19, 2018

(86) PCT No.: PCT/US2018/056752
§ 371 (c)(1),
(2) Date: Mar. 8, 2021

(87) PCT Pub. No.: WO2020/081096
PCT Pub. Date: Apr. 23, 2020

(65) Prior Publication Data
US 2021/0344080 A1    Nov. 4, 2021

(51) Int. Cl.
*H01M 50/446* (2021.01)
*H01M 50/429* (2021.01)
*H01M 50/406* (2021.01)
*H01M 50/44* (2021.01)
*H01M 50/434* (2021.01)

(52) U.S. Cl.
CPC ....... *H01M 50/446* (2021.01); *H01M 50/406* (2021.01); *H01M 50/4295* (2021.01); *H01M 50/434* (2021.01); *H01M 50/44* (2021.01)

(58) Field of Classification Search
CPC ..................... H01M 50/44; H01M 50/434
See application file for complete search history.

(56) References Cited

U.S. PATENT DOCUMENTS

| 9,718,054 | B2 | 8/2017 | Scher et al. |
| 9,994,715 | B2 | 6/2018 | Yushin et al. |
| 2013/0270180 | A1 | 10/2013 | Zhang et al. |

(Continued)

FOREIGN PATENT DOCUMENTS

| CN | 102826526 A | 12/2012 |
| CN | 103118777 A | 5/2013 |
| CN | 104900846 A | 9/2015 |

(Continued)

OTHER PUBLICATIONS

He et al., "Pure Inorganic Separator for Lithium Ion Batteries", ACS Applied Materials and Interfaces, 2014, 7(1):738-742.

(Continued)

*Primary Examiner* — Stephan J Essex
(74) *Attorney, Agent, or Firm* — Fish & Richardson P.C.

(57) ABSTRACT

This invention relates to novel battery separators comprising ceramic nanowires, more specifically, inorganic carbonate nanowires. The novel ceramic nanowire separators are suited for use in lithium batteries, such as lithium ion rechargeable, lithium metal rechargeable and lithium sulfur rechargeable batteries, and provide high safety, high power density, and long cycle life to the fabricated rechargeable batteries. The battery separators comprise ceramic nanowires that may be optionally bonded together by organic polymer binders and/or may further comprise organic nanofibers.

20 Claims, 6 Drawing Sheets

(56) References Cited

U.S. PATENT DOCUMENTS

2017/0114454 A1 4/2017 Chenevier et al.
2017/0233579 A1 8/2017 Yushin et al.

FOREIGN PATENT DOCUMENTS

| CN | 106711449 A | 5/2017 |
|---|---|---|
| CN | 106876828 | 6/2017 |
| WO | WO2015176609 | 11/2015 |

OTHER PUBLICATIONS

Lei et al., "Transformation of Bulk Alloys to Oxide Nanowires", Science, 2017, 355(6322):267-271.
Li et al., "Flexible, High-Wettability and Fire-Resistant Separators Based on Hydroxyapatite Nanowires for Advanced Lithium-Ion Batteries", Advanced Materials, 2017, 29(44):1703548.
PCT International Search Report and Written Opinion in International Appln. No. PCT/US2018/56752, dated Dec. 21, 2018, 9 pages.
Xiang et al., "An Inorganic Membrane as a Separator for Lithium-Ion Battery", Journal of Power Sciences, 2011, 196(20):8651-8655.
First Office Action in Chinese Appln. No. 201880097217.5, dated Apr. 8, 2022, 10 pages (with English Translation).
First Search Report in Chinese Appln. No. 201880097217.5, dated Mar. 19, 2022, 2 pages.
Zhang et al., "Study of Hydrothermal Synthesis of Pile Sodium Aluminum Stone," Silicate Journal, Apr. 30, 2003, 31(4):336-340.

CERAMIC NANOWIRE BATTERY SEPARATORS

GOVERNMENT SUPPORT

This invention was made with government support under DOE Grant DE-SC0013732 awarded by United States Department of Energy. Accordingly, the government has certain rights in this invention.

CROSS-REFERENCE TO RELATED APPLICATIONS

The application is a U.S. national phase application filed under 35 U.S. C. § 371 of International Application No. PCT/US2018/056752, filed on Oct. 19, 2018, which is incorporated herein by reference in its entirety.

TECHNICAL FIELD

This invention relates to novel battery separators comprising ceramic nanowires, more specifically, inorganic carbonate nanowires. The novel nanowire separators are suited for use in lithium batteries, such as lithium ion rechargeable, lithium metal rechargeable and lithium sulfur rechargeable batteries, and provide high safety, high power density, and long cycle life to the fabricated rechargeable batteries. The battery separators described herein comprise ceramic nanowires that may be optionally bonded together by organic polymer binders and/or may further comprise organic nanofibers.

BACKGROUND ART

Lithium ion batteries (LIBs) are the mainstream rechargeable batteries used in portable consumer electronic appliances, such as cell phones, tablets and laptop computers. They are also becoming the preferred energy storage choice for various electric vehicles (EVs). Lithium ion batteries consist of anode, cathode, electrolyte, and separator. The battery separator is a porous thin membrane between an anode and a cathode. The essential function of a battery separator is to prevent electronic contact of the anode and the cathode while enabling sufficient ionic transport between the electrodes. The battery separator can significantly affect the safety, energy density, power density, and cycle life of a rechargeable battery. Electrode contact in batteries will generate high electric current and thereby high temperature and will often lead to catastrophic results. Battery fire incidents reported from cell phones, electric vehicles to airplanes are commonly attributed to the contact of the anode and the cathode.

Currently, commercial LIBs mainly use porous polymer membranes as battery separator. These battery separators are made of polyolefin membranes, including polyethylene (PE), polypropylene (PP), or their combination. These polymer separators have good electrochemical stability and good mechanical strength at room temperature, but poor thermal stability. When exposed to high temperature, these polymer separators exhibit extensive thermal shrinkage and significant structural degradation, which may trigger internal short circuit in the LIBs and lead to fire or explosion of the batteries. In addition, there are long term stability and safety concerns about polymer battery separators. Polymer separators which are stressed during the manufacturing process will, over time, creep to relieve their residual stresses, as well as undergo very slow secondary morphological changes upon time, which can lead to the shrinkage, tearing, or pinhole formation of the separators in a long-time frame, and contribute to battery failure, and possibly catastrophic damages. Moreover, these polymer battery separators may shrink or close their pores under the sandwich pressure of anode and cathode due to the volume change of electrodes during charge/discharge, and thus shorten the cycle life of a rechargeable battery due to slower transport of lithium ions. Therefore, the conventional polymer separator technology has many difficulties in meeting the increasingly stricter high safety, long-term stability, and long cycle life requirements for various electric vehicle applications and grid energy storage. Advanced battery separators with good mechanical and structural integrity at high temperatures and for a long term and offering long cycle life are becoming a critical requirement for the wide adoption of LIBs in EVs and grid.

Ceramic materials have excellent thermal properties (long term thermal stability and high temperature thermal stability), excellent mechanical property, and intrinsic chemical stability. Ceramic materials should be the best choice as the building blocks for battery separators that can meet the high safety, long-term stability, and long cycle life requirements for various electric vehicle applications. Battery separators containing ceramic materials may also offer the fabricated rechargeable batteries with high temperature operation stability, high power density, etc. However, the fabrication of thin, flexible, or even pleatable, ceramic porous membranes as battery separators have been extremely challenging.

Ceramic nanoparticle materials have been used to improve the high temperature stability of polymer battery separators. Two typical approaches have been used. In the first approach, ceramic nanoparticles are directly dispersed into the polymer matrix during processing, and composite separators are formed by extrusion method. This family of products have been researched and developed by several companies but have not become a major player in battery separator market. In the second approach, ceramic nanoparticles are coated onto the surface of a porous polymer support membrane, and bilayer battery separators are formed. This family of products have gradually become the replacement of pure polymer battery separators. These polymer separators modified by ceramic nanoparticles exhibit improved thermal properties, but only to limited extent. At high temperatures, these separators still exhibit severe shrinkage, since the backbone of these separators is still a polymer network.

An attempt to make a pure ceramic battery separator was reported in 2011 (J. Power Sources, pp. 8651 (2011)). The separator was fabricated by sintering alumina nanoparticles at high temperature (1000° C.). Compared with polymer-based separators, the sintered alumina nanoparticle separator exhibited no shrinkage at high temperature. In addition, the sintered alumina nanoparticle separator exhibited strong electrolyte absorption and much higher ionic conductivity than the polymer separators. It was also reported that battery cells with this sintered alumina nanoparticle separator exhibited better performance, including discharge capacity, rate capability and low-temperature performance than those with polymer separators. Although the performance of this sintered alumina nanoparticle separator is good, it is obvious that a pure ceramic separator made of sintered alumina nanoparticles is rigid, brittle, and thick. The rigidness and brittleness of the separator will greatly reduce the means of manufacturing and make a continuous battery fabrication process difficult. A thick separator will increase the battery weight and thus lower the energy density of the battery.

These shortcomings essentially prohibit its potential applications in lithium ion batteries.

The great electrochemical performance of this sintered pure ceramic nanoparticle battery separator called for the research and development of making flexible ceramic battery separator. Ceramic nanowires are one-dimensional nanostructured materials with a diameter of from about 1 nm to about 1000 nm and a length of from microns to even hundreds of microns. Due to their high aspect ratio, ceramic nanowires are premium building blocks for forming thin flexible ceramic membranes. In a 2015 publication (ACS Appl. Mater. Interfaces, 7, 738 (2015)), an aluminum oxide nanowire battery separator was reported and demonstrated good high temperature performance in a lithium ion battery. Another alumina nanowire battery separator was reported in 2017 (Science 355, 267 (2017)) and 2018 (U.S. Pat. No. 9,994,715 B2). The alumina nanowires were made using lithium aluminum alloy as starting material and anhydrous alcohol as reacting agent, and with a high temperature calcination step. The cost of raw materials (pure lithium metal and pure aluminum metal) and the cost of the strict anhydrous preparation procedure are both high, which make this alumina nanowire membrane impractical for large scale commercial use as battery separator due to its potential high manufacturing cost. A hydroxyapatite (HAP) nanowire battery separator was reported in 2017 (Adv. Materials, 29, 1703548 (2017)). The HAP nanowires were made using calcium oleate and sodium dihydrogen phosphate precursor as starting materials and a large amount of alcohol and organic amine as solvents. Though the HAP nanowire product has proper diameter and high aspect ratio, the HAP nanowire product yield is extremely low (~0.3 wt % nanowire content in the as-prepared nanowire product), which is impractical for large scale commercial use as battery separator due to its potential high manufacturing cost.

DISCLOSURE OF INVENTION

The invention discloses a battery separator comprising inorganic carbonate nanowires, more specifically, dihydroxyaluminum sodium carbonate nanowires. When ceramic nanowires are produced with suitable diameters and suitable lengths, they can form into an entangled web, which if properly formed, will result in a membrane product that is thin, strong, flexible and even pleatable, yet maintaining the thermal and chemical stability of the ceramic materials, thus making ceramic nanowires the premium building blocks for battery separators. In the energy storage field, the inventors have discovered and demonstrated that porous membranes comprising inorganic carbonate nanowires, especially dihydroxyaluminum sodium carbonate nanowires, can be made to be very thin, uniform, strong and flexible as high-performance battery separators for potential large-scale commercial applications.

Ceramic nanowires must meet several criteria in order to be a practical building block for battery separators. The first criterion is that the ceramic nanowires must be non-electrically conductive, since electrically conductive nanowires, even at semiconductor conductivity level, will at least lead to a fast self discharge when a charged battery is not in use. The second criterion is low manufacturing cost in order to be economically adoptable for large scale commercial use. Any ceramic nanowires that may have high manufacturing cost are not suitable for making nanowire battery separator. The third criterion is that the nanowires should be able to be processed to produce a uniform slurry and to make thin battery separators. With these three key criteria in mind, the inventors have focused on the inorganic carbonate nanowires, especially inorganic carbonate nanowires containing calcium, magnesium and aluminum, and more specifically, dihydroxyaluminum sodium carbonate nanowires, prepared via a low cost hydrothermal growth process (Example 1) as the building blocks for battery separators.

The invention discloses a thin, uniform, and flexible (even pleatable) ceramic nanowire membranes as next generation high performance battery separators. Moreover, the invented ceramic nanowire separators can also meet many other strict requirements of a membrane as a battery separator: high temperature stable, suitable pore size, high porosity, mechanically strong, etc. And most importantly, the invented ceramic nanowire battery separators have demonstrated superior electrochemical performance in rechargeable batteries.

The use of membranes comprising dihydroxyaluminum sodium carbonate nanowires as battery separators is novel and not obvious, since no one knows before real battery tests whether these inorganic carbonate nanowires are stable or not in the real and complicated electrochemical environment of a rechargeable battery. The inventors have proved and demonstrated that these carbonate nanowires can be prepared at low cost with high throughout, can be processed into a uniform nanowire slurry, can be made to thin, uniform and flexible (even pleatable) membranes, and more importantly, can be used in real rechargeable batteries, and the fabricated rechargeable batteries with the carbonate nanowire membranes as separators have demonstrated high power density, long cycle life, and high safety, as demonstrated in Examples 8, 9, and 10.

The invention also discloses that adding organic polymer binders and/or cellulose nanofibers can improve the flexibility and mechanical strength of the ceramic nanowire separators. The addition amount of these organic polymers or cellulose nanofibers is limited to less than 50%, and more preferably less than 20%. With these additions, the improvement of flexibility and mechanical strength is noticeable. The polymer binders are preferably water soluble polymers including polyvinyl alcohol, polyvinylpyrrolidone, poly (acrylic acid-co-maleic acid) (PAMA), carboxymethyl cellulose, etc. The addition of minor component of organic polymer as binder or the addition of minor component of cellulose nanofibers have no deteriorated effect on the high temperature dimensional integrity of the formed ceramic nanowire separator, since the main backbone of the separator is still a ceramic nanowire network. Surprisingly, the addition of cellulose nanofibers also brings benefits of longer cycle life to the fabricated lithium ion batteries (Example 9 and 12), though the scientific reasons are not clear at this moment.

Hydrothermal growth has been widely used in the industry production of zeolite (a porous silica) and is a cost effective approach to manufacture various ceramic nanowires. Hydrothermal formation of inorganic materials is a process where a solution of inorganic precursors and associated chemicals are reacted at controlled temperatures and pressures. Once proper conditions of solution components and concentrations, as well as reaction conditions are identified, crystallization and precipitation occur and a yield of nanowires may be obtained. In the hydrothermal growth of dihydroxyaluminum sodium carbonate nanowires, the raw materials are common industry chemicals such as aluminum isopropoxide, the nanowire shaping additives are common industry chemicals, such as sodium hydroxide, the solvent is water, the growth temperature is low (~140° C.), the hydrothermal pressure is low (<10 bar), the treatment time is short (~12-24 hours), and the nanowire throughput is high (~20 wt % nanowires in the as-prepared product). Such a low cost and high throughput manufacturing process of the ceramic nanowires set the foundation for the large scale commercialization of the ceramic nanowire battery separators.

Battery separators need to have proper pore sizes for fast lithium ion transport and for preventing the direct contact of anode or cathode. The pore size of a battery separator cannot be too small (too slow lithium ion transport) or too big (high possibility for electrode contact). This pore size requirement in turn requires that the ceramic nanowires used to make nanowire membranes should have proper diameters. Nanowires with a diameter of from about 10 nm to about 500 nm are suitable to construct the invented battery separators. Small diameters, such as 4 nm, result in small pores in the fabricated membrane and very slow lithium ion transport. Excessively large diameters, for example, larger than 500 nm, produce membranes with large pores or defects which may allow the direct contact of anode and cathode. At the same time, the ceramic nanowires need to have a minimum length. If the ceramic nanowires have a too short length, such as less than 5 micron, there is not enough entanglement among nanowires in the formed membrane, so a strong and flexible nanowire membrane is not achievable. In principle, the length of the ceramic nanowires has no up limit. If the ceramic nanowires have a too long length, such as longer than 500 microns, the nanowires can be controllably processed and shorten to a shorter length, and a uniform and thin nanowire membrane can be still formed. The same diameter and length requirements apply to cellulose nanofibers when cellulose nanofibers are added into the membrane formation.

The battery separators need to be as thin as possible to reduce its weight or volume portion in the final battery. However, the thinner the separator, the weaker its mechanical strength. A thickness of about 3 microns to about 30 microns is a suitable thickness, and the inventors has achieved such kind of thin ceramic nanowire membranes in a uniform form.

The battery separators comprising ceramic nanowires can be made to have a high porosity. A preferred porosity of the ceramic nanowire battery separators is from about 45% to about 85%. A porosity lower than 45% does not exhibit the ion transport advantages of the nanowire battery separators, and a porosity higher than 85% leads to weak and non-uniform nanowire membranes.

The battery separators comprising ceramic nanowires can be made to have an excellent flexibility by the inventors. More specifically, the inventors have been able to fabricate ceramic nanowire membranes with extraordinary flexibility. A pure ceramic nanowire membrane with no organic polymer binder and no cellulose nanofibers can be formed to be even pleatable, which can be Z-folded and opened without noticeable damage, as showed in FIG. 6. The realization of this superior flexibility of the nanowire separator membranes opens the opportunity of making pouch cells by Z-folding. Addition of a suitable organic polymer binder or addition of cellulose nanofibers can be used to maintain or improve the pleatability. This pleatability of the nanowire membrane is realized by carefully optimizing the starting materials, the nanowire growth conditions, the nanowire milling process, and the filtration process.

This invention also discloses an inventive preparation process for making the battery separator comprising inorganic carbonate nanowires. The low-cost carbonate nanowires from the hydrothermal process is used as starting materials. However, the as-prepared ceramic nanowires cannot be used directly in wet laid filtration process to fabricate thin and uniform nanowire membranes. The as-prepared nanowires from hydrothermal growth is a wax-like solid that has to be processed and dispersed first. The inventors have found that three-roll milling method to process the as-prepared ceramic nanowires is a preferred inorganic nanowire processing method for making thin and uniform battery separator. The three-roll mill milling leads to the formation of a uniform processed nanowire slurry that can be used to make uniform, thin, flexible, and strong ceramic nanowire membranes by vacuum filtration process. Optimized roller gap, milling speed, and processing times have been established. Three-roll mill milling is also a low-cost method due to its high throughput and continuous operation manner. Other nanowire processing methods, such as mechanical stirring processing, ultrasound sonication processing, or blade blender processing, do not lead to thin and uniform nanowire membranes, while the uniformity of the battery separator is very important to the safety and cycle life of the assembled lithium ion battery.

Vacuum filtration is found to be a preferred nanowire membrane formation method. Ceramic nanowire slurry prepared from the three-roll mill milling process is dispersed in deionized (DI) water to form a nanowire suspension. Here, water is used as the dispersing media, which is cheap and environment friendly. Vacuum filtration allows the uniform deposition of ceramic nanowires in the nanowire suspension on a porous support membrane, and allows the formation of a uniform wet nanowire membrane with no defects such as pinholes, etc. The membrane thickness is controlled by adjusting the amount of the added nanowire suspension. The wet nanowire membrane is then dried. After drying, a freestanding, thin, uniform and flexible nanowire membrane is obtained by releasing it from the support membrane. When organic polymer binder or cellulose nanofibers are needed for making the nanowire membranes, they are added in the nanowire dispersion step, and the other steps are carried out as same.

The invented ceramic nanowire membranes are then used as battery separators for fabricating rechargeable lithium ion pouch cells. The novel battery separator is capable of delivering protection against physical damages such as nail penetration, as demonstrated by Example 10 and 13. The scientific foundation of this high safety feature is the high temperature stability of the invented ceramic nanowire separator. The inventors also found that the invented battery separator leads to longer cycle life to the fabricated lithium ion batteries, as demonstrated by comparing Example 9 and 12 with Comparative Example 2. Possible mechanism of this longer cycle life is that the highly stable ceramic nanowires maintain the pore size of the nanowire separator even after thousands of charge/discharge cycles. It is also possible that the nanowires used here has basic (relatively to acidic) property, which can neutralize the HF species generated during the operation of the lithium ion battery.

BRIEF DESCRIPTION OF DRAWINGS

FIG. 1 is a conceptual illustration of the ceramic nanowire battery separator. For the purpose of illustrating the invention, there is shown in the drawing a form which only comprises ceramic nanowires; it being understood, however, that it may also comprise a minor component such as polymer binders and/or cellulose nanofibers, and this invention is not limited to the precise structure.

BEST MODE FOR CARRYING OUT THE INVENTION

Preferred embodiments of the present invention are given below, but the present invention is not in any way limited by these embodiments.

The preparation of dihydroxyaluminum sodium carbonate nanowires is realized by hydrothermal growth. In the hydrothermal growth, deionized (DI) water, sodium bicarbonate and sodium hydroxide are added to a blender jar and blended to form a solution. Aluminum isopropoxide is then added and blended to produce a slurry. The blender can be any blender which has the power to break aluminum isopropoxide and is inert to weak base. The slurry is then transferred into a pressure vessel, which is then sealed and heated at elevated temperature for 12 to 96 hours, preferably 24 hours. Then the pressure vessel is cooled to room temperature, and dihydroxyaluminum sodium carbonate nanowires are obtained. In addition to aluminum isopropoxide, aluminum butanoxide, fumed alumina (Evonik), and self-made aluminum hydroxide precipitate, etc., can all be used as the starting materials for the hydrothermal growth. Among them, aluminum isopropoxide is the most preferred. The weight ratio of water to aluminum isopropoxide is from about 7:1 to 1:1, preferably about 3.5:1. The molar ratio of sodium in sodium bicarbonate to aluminum in aluminum isopropoxide is from about 2:1 to about 1:2, preferably about 1:1. The addition of sodium hydroxide is to adjust the pH of the solution to between about 10 to about 11. The weight ratio of sodium hydroxide to water is about 1:50 to 1:250, preferably about 1:140. The addition amount of sodium hydroxide may be adjusted according the pH of the used DI water. If the pH of the starting slurry is less than about 9, the nanowire growth is not good, as evidenced by many nanoparticles in the final product. If the pH of the starting slurry is higher than about 12, the final nanowire yield is low due to the formation of large amount of soluble sodium aluminate. The hydrothermal temperature is between about 100° C. to about 180° C., preferably between about 120° C. to about 160° C., more preferably about 140° C. Lower hydrothermal temperature such as 100° C. needs longer treatment time, such as 96 hours, while higher temperature is limited by the pressure vessel lined with Teflon.

The as-prepared nanowires from the hydrothermal growth is a wax-like solid with a pH between about 10 to about 11. It is better to remove the excess sodium hydroxide before three roll milling, since high pH slurry may damage the three-roll mill rollers and its parts. DI water is added into the as-prepared nanowire product with a weight ratio of from about 5:1 to about 10:1 (water:nanowires), and then the wax-like nanowire solid is broken into small chunks by mechanical forces, such as mechanical stirring or mechanical crushing, preferably to a size of less than about 3 mm, or more preferably to a size of less than about 1 mm. A small amount of concentrated hydrogen chloride solution is added to the slurry to adjust its pH to about 7. Mechanical stirring is used to stir the slurry for at least half an hour to allow complete neutralization. During the process, the pH of the slurry may go higher due to the release of sodium hydroxide from the inside of the nanowire chunks, and more hydrogen chloride is needed to bring it back to pH 7. Other acid such as sulfuric acid and nitric acid can all be used for the neutralization. The neutralized nanowire slurry is then dewatered by filtering through a porous membrane, e.g., an ultrahigh molecular polyethylene membrane (UHMWPE) (7 to 12 micron pore size), with a vacuum filtration. The filtrate is then washed twice using DI water by filtration. Pressure filtration and centrifuge can all be used for the removal of water.

The washed nanowire slurry is mixed with DI water to make a honey like slurry for three roll milling. The milling is realized on an EXAKT 50 three roll mill. Any other well controlled three roll mill with close tolerances will be also suitable for the milling process. The roller gap is set according to the following principle for each milling: the first roller gap is 30% to 50% larger than the second roller gap. The slurry is often milled two or three times, with three times is more preferable for forming uniform and pleatable membranes. For the last time milling, the second roller gap should be set between about 10 microns to about 50 microns, preferably between about 20 microns to about 30 microns. Other mills may require slight adjustments to these settings. The milling speed is preferably set at 80% of the full speed of the machine. While lower milling speed (such as 30% of the full speed) is workable, higher milling speed (such as 70% to 90% of the full speed) can lead to higher throughput. The final milled product is a white cream-like product containing about 6% to 9% solid nanowires. Users skilled in the art will be able to easily adapt these guides to different mills and slurries.

The milled nanowire is then dispersed into basic DI water to form a diluted nanowire suspension. The nanowire concentration is about 0.1 wt % to about 1 wt %, preferably about 0.2 wt % to 0.3 wt %, of nanowires in water. The basic DI water is prepared by adding 2 to 6 gram, preferably 4 gram, of sodium hydroxide in 2 L water. The use of basic DI water leads to a homogenous dispersion of nanowires in water, and thus the formation of uniform nanowire membranes eventually. If DI water with a pH of 7 or lower is used, the milled nanowires form agglomerates in the water, and a uniform nanowire membrane can not be formed. If DI water with higher pH than that of the basic water described here is used, a significant amount of the nanowires will be dissolved in the high pH water.

The wet nanowire membrane is then formed by vacuum filtration of the above dispersed nanowire suspension through a microporous membrane. The preferred microporous membrane is a flat porous membrane with a pore size of between 5 to 20 microns, more preferably 7 to 12 microns. Other filtration methods, such as pressure filtration, are also suitable for the wet nanowire membrane formation. The wet nanowire membrane is washed by pouring or spraying DI water (about pH 7) twice to remove excess sodium hydroxide when the wet nanowire membrane is still on the filtration membrane. The wet nanowire membrane on the filtration membrane is then dried at room temperature or at elevated temperatures. For drying at elevated temperatures, the wet nanowire membrane is covered by a porous membrane, such as Celgard PP separator, and is placed on a dryer for drying. Many drying apparatus, such as sheet dryer, heat press, drum dryer, and hot air dryer, can be used for the drying process. The drying temperature is from about 70° C. to about 100° C., preferably about 80° C. After drying, the top cover membrane is taken off, and the dry nanowire membrane is released from the bottom filtration membrane.

The dry nanowire membrane is then cut to small sheets with a certain dimension for pouch cell assembly. The cutting can be realized by any cutting methods if a clean and sharp cut can be realized, such as scissor, paper cutter, and laser cutter, etc. The nanowire membranes are dried at 100° C. to 120° C. during the pouch cell assembly, preferably at 110° C., under vacuum for min 24 hours. Lower drying temperature such as 90° C. may leave some moisture in the battery separator, which may cause a shorter cycle life to the fabricated battery. Higher drying temperature such as 120° C. may cause problem to the pouch cell case since the pouch cell case is often laminated with some polymer layers.

The characterizations of the assembled pouch cells including battery capacity, rate capability, cycle life, nail penetration, etc., are carried out following general battery characterization processes as described in Examples. It is clear that the pouch cells using pure ceramic nanowire membranes and ceramic nanowire-cellulose nanofiber membranes as battery separators have longer cycle life (Example 9, 12, Comparative Example 2) and higher nail penetration safety (Example 10, 13, Comparative Example 3) than those pouch cells using Celgard 2325 as battery separators.

Hereinafter, the present invention will be described in more detail with reference to the following Examples. However, the present invention is not at all limited by the following Examples, and can be embodied in various other forms appropriately modified without changing the spirit of the invention.

Example 1

Figure 1:
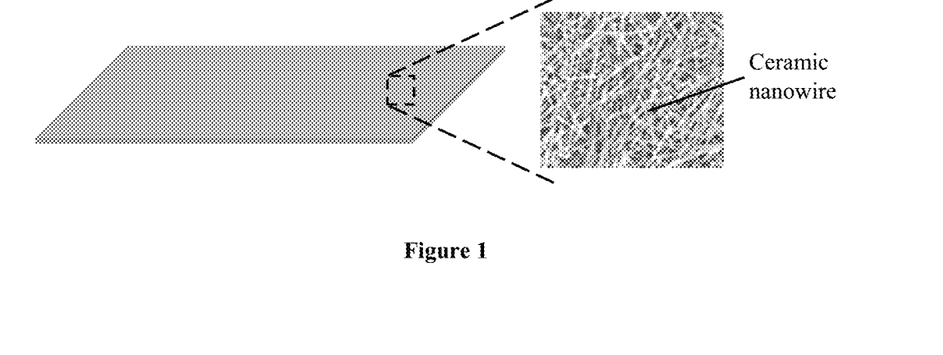
Figure 2:
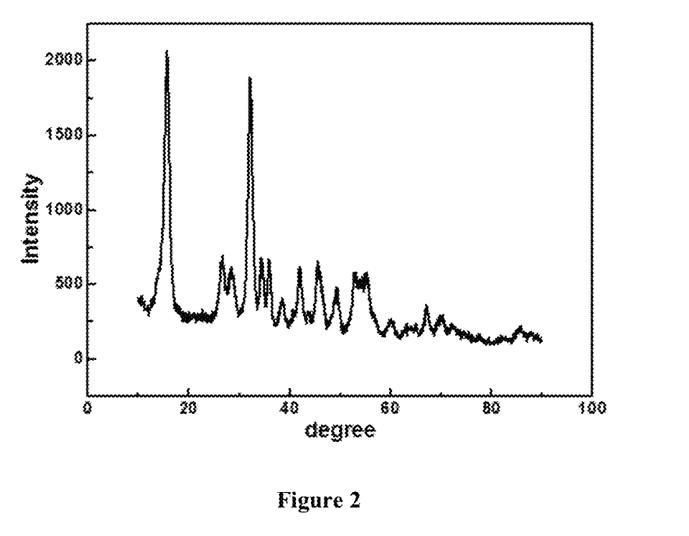
FIG. 2 is an XRD profile of the ceramic nanowires from Example 1.
Figure 3:
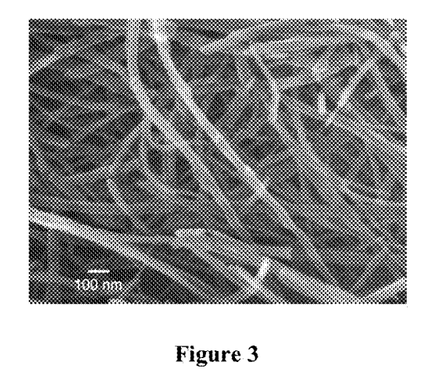
FIG. 3 is an SEM image of the ceramic nanowires from Example 1.

The Preparation of Ceramic Nanowires 140 ml deionized (DI) water, 12.6 g baking soda (Arm & Hammer) and 1.0 g sodium hydroxide (Aldrich, >95%, flakes) were added to a blender jar and were blended to form a solution (Solution A). 40 g aluminum isopropoxide (Alfa Aesar, 98+%) was added to Solution A and was blended to produce a slurry (Slurry B). Slurry B was then transferred into a 500 ml pressure vessel, which was then sealed and heated at 140° C. for 24 hours. Then the pressure vessel was cooled naturally to room temperature, and dihydroxyaluminum sodium carbonate nanowires were obtained. XRD characterization revealed the as-prepared nanowire product has a major crystal phase of dihydroxyaluminum sodium carbonate (major product) with a very small amount of aluminum oxide hydroxide crystal phase, as shown in FIG. 2. The resultant nanowire product was characterized for morphology by using scanning electron microscopy (SEM), as shown in FIG. 3. SEM image indicated that the nanowires have a diameter of about 20 nm to 60 nm.

Example 2

The Preparation of Pure Ceramic Nanowire Membranes

Figure 4:
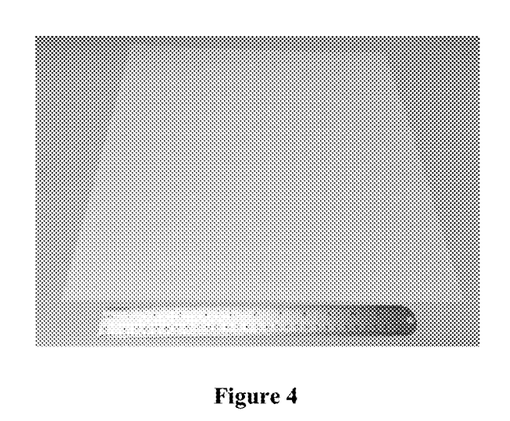
FIG. 4 is a photograph of a ceramic nanowire separator membrane from Example 2.
Figure 5:
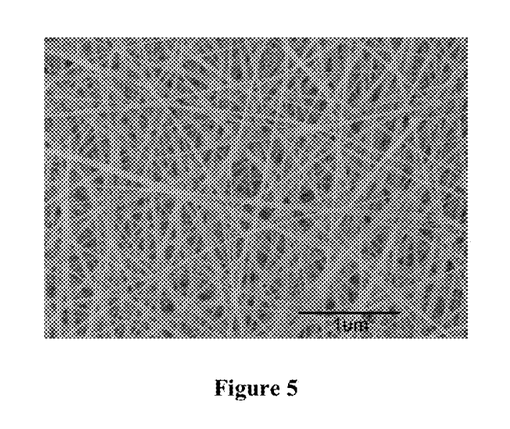
FIG. 5 is an SEM image of the surface of a ceramic nanowire separator membrane from Example 2.
Figure 6:
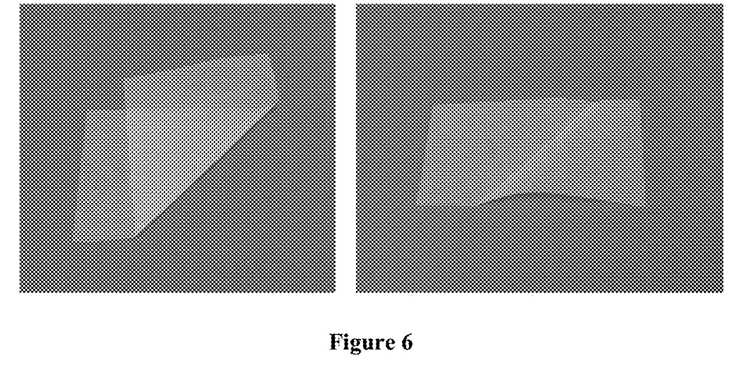
FIG. 6 are two photographs of a pure ceramic nanowire membrane from Example 2. In this figure, the pure ceramic nanowire membrane was 180° folded and re-opened to demonstrate its pleatability.

The ceramic nanowires from Example 1 was mixed with DI water in a weight ratio of about 6:1 (water:nanowires). The wax-like nanowire solid was then broken into small chunks by mechanical crushing. A small amount of concentrated hydrogen chloride solution was added to the slurry to adjust its pH to about 7. The neutralized nanowire slurry was then filtered through an UHMWPE membrane (7 to 12 micron pore size) with a vacuum filtration, and washed twice using DI water to form a wet cake. The washed wet cake was mixed with DI water to form a honey-like slurry. The slurry was then processed through an EXAKT 50 three-roll mill three times with the final roller gap of about 30 micron to get a very uniform nanowire slurry with about 7.5% solid nanowires. We name this slurry as the Milled Nanowire Slurry for the convenient use in the following Examples. The Milled Nanowire Slurry was dispersed in basic DI water (prepared by adding 4.4 g of sodium hydroxide in 2.2 L DI water) to form a nanowire suspension which comprised 0.24 wt % of ceramic nanowires. 2.2 L of the formed nanowire suspension was then poured into a 42 cm×42 cm filtration system and filtered through a porous UHMWPE membrane (7 to 12 micron pore size) under vacuum. The wet nanowire membrane was washed by DI water (pH 7) twice and dried at room temperature. The dried nanowire membrane was then released from the UHMWPE membranes, resulting in the final freestanding ceramic nanowire membrane. The resultant ceramic nanowire membrane had a thickness about 25 microns and kept its dimensional integrity after heating at 500° C. in air for 30 mins. FIG. 4 shows a photograph of a representative fabricated ceramic nanowire membrane. FIG. 5 shows a representative SEM image of the surface of a fabricated ceramic nanowire membrane. FIG. 6 shows a representative fabricated ceramic nanowire membrane that is flexible enough for 180-degree folding (pleatable).

Example 3

The Preparation of Ceramic Nanowire-Cellulose Nanofiber Separator Membranes

Figure 7:
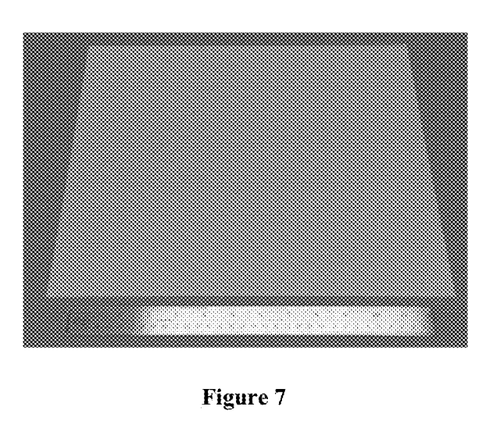
FIG. 7 is a photograph of a ceramic nanowire-cellulose nanofiber separator membrane from Example 3.

Cellulose nanofibers (Guilin Qihong Technology Co., Ltd.) were dispersed in DI water by a blade blender to form a cellulose nanofiber suspension (~0.5 wt %). The Milled Nanowire Slurry from Example 2 was then added to the cellulose nanofiber suspension, and the mixture was further dispersed using basic DI water (4.4 g of sodium hydroxide in 2.2 L DI water) to form a mixture suspension, which comprised 0.22 wt % of ceramic nanowires and 0.024 wt % of cellulose nanofibers. 2.2 L of the formed mixture suspension was then poured into a 42 cm×42 cm filtration system and filtered through a porous UHMWPE membrane (7 to 12 micron pore size) under vacuum. The wet ceramic nanowire-cellulose nanofiber membrane was washed by DI water (pH 7) twice and dried at room temperature. The dried ceramic nanowire-cellulose nanofiber membrane was then released from the UHMWPE membrane, resulting in the final freestanding ceramic nanowire-cellulose nanofiber membrane. The resultant membrane had a thickness about 20 microns and kept its dimensional integrity after heating at 500° C. in air for 30 mins. The ceramic nanowire-cellulose nanofiber membrane has a better flexibility and stronger mechanical strength as determined by easier physical handling capabilities than the pure ceramic nanowire membrane prepared in Example 2. A photograph of a representative fabricated ceramic nanowire-cellulose nanofiber membrane is presented in FIG. 7.

Example 4

The Preparation of Ceramic Nanowire Separator Membranes with Polyvinylpyrrolidone (PVP) Binder The Milled Nanowire Slurry from Example 2 was dispersed in basic DI water (prepared by adding 4 g of sodium hydroxide in 2 L DI water) and then mixed with a PVP aqueous solution to form a nanowire suspension which comprised 0.27 wt % of ceramic nanowires and 0.95 wt % PVP. 60 ml of the formed nanowire suspension was then poured into a Ø9 cm filtration system and filtered through a porous UHMWPE membrane (7 to 12 micron pore size) under vacuum. The wet nanowire membrane was washed by DI water (pH 7) twice, covered by a Celgard PP separator, and dried on a sheet dryer (Adirondack Machine) at about 80° C. The dried nanowire membrane was then released from the UHMWPE membranes, resulting in the final freestanding PVP bonded ceramic nanowire membrane. The resultant membrane kept its dimensional integrity after heating at 500° C. in air for 30 mins. The PVP bonded ceramic nanowire membrane has a better flexibility and stronger mechanical strength as determined by easier physical handling capabilities than the pure ceramic nanowire membrane prepared in Example 2.

Example 5

The Preparation of Ceramic Nanowire Separator Membranes with Poly(Acrylic Acid-Co-Maleic Acid) (PAMA) Binder The Milled Nanowire Slurry from Example 2 was dispersed in basic DI water (4 g of sodium hydroxide in 2 L DI water) and then mixed with a PAMA aqueous solution to form a nanowire suspension which comprised 0.27 wt % of ceramic nanowires and 0.79 wt % PAMA. 60 ml of the formed nanowire suspension was then poured into a Ø9 cm filtration system and filtered through a porous UHMWPE membrane (7 to 12 micron pore size) under vacuum. The wet nanowire membrane was washed by DI water (pH 7) twice, covered by a Celgard PP separator, and dried on a sheet dryer (Adirondack Machine) at about 80° C. The dried nanowire membrane was then released from the UHMWPE membranes, resulting in the final freestanding PAMA bonded ceramic nanowire membrane. The resultant membrane kept its dimensional integrity after heating at 500° C. in air for 30 mins. The PAMA bonded ceramic nanowire membrane has a better flexibility and stronger mechanical strength as determined by easier physical handling capabilities than the pure nanowire membrane prepared in Example 2.

Example 6

Figure 8:
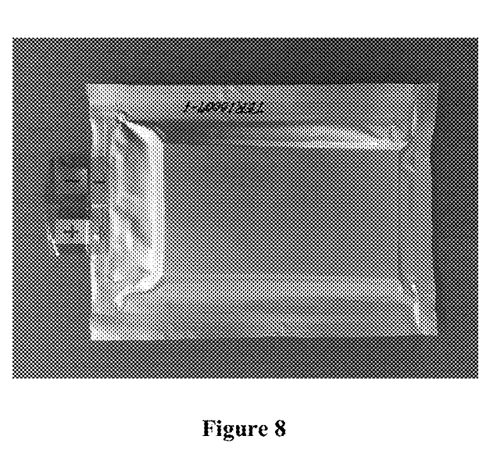
FIG. 8 is a photograph of a 2Ah pouch cell from Example 6 using pure ceramic nanowire membrane as separator.

The Fabrication of 2Ah Pouch Cells Using Pure Ceramic Nanowire Membranes as Separators and Cell Formation 2Ah pouch cells were fabricated by using graphite as anode, lithium nickel manganese cobalt oxide (NMC532) as cathode, and $LiPF_6$ in a trinary blend of carbonates as electrolyte, and the pure ceramic nanowire membranes prepared in Example 2 as separator. The anode is a 5-10 μm spherical-type artificial graphite. The cathode NMC532 has a particle size of 5 μm to 10 μm. The pouch cells were fabricated by a stacking method in a dry room. Both anode and cathode were coated using polyvinylidene fluoride (PVDF) binders, which were maximum 5% of the electrode formulation. Powder conductivity additives were also added to both anode and cathode, which were also maximum 5% of the electrode formulation, with a higher percentage additive in the cathode. The anode was coated on high purity electrodeposited copper foil with a maximum foil thickness of 10 μm. The cathode was coated on primer-coated aluminum foil with a maximum foil thickness of 20 μm. Coated anode and cathode electrode roll stocks were then converted into individual tabbed electrode plates. Then the anode and cathode plates were stacked alternatively with the separator sheet in between, forming an electrode plate/separator sandwich. 10 mm wide tab leads (featuring pre-attached heat sealing tape pads) were ultrasonically welded to the electrode plate tabs. The welded electrode plate/separator sandwich was then placed into a sheet of aluminum laminate pouch material. The electrode plate/separator sandwich was immobilized within the aluminum pouch packaging following the main heat sealing at three sides with one side open to fill electrolyte, which packaged the electrode plate/separator sandwich within the pouch, set the terminals in place, and created a hermetic seal. The packaged cell was vacuum dried at 110° C. for min. 24 h. Following vacuum drying, the dry cell was imported into an argon-filled glove box and dosed with electrolyte. The activated cell was subjected to 3 cycles of rapid vacuum-to-ambient pressure cycling to ensure all pore space within the cell was wetted, and then the final heat seal was made to totally seal and complete the final pouch cell. FIG. 8 shows a photograph of the fabricated 2Ah pouch cell.

After the pouch cell fabrication, a cell formation was carried out on the fabricated pouch cells. The following protocol was used for the pouch cell formation. Following an additional 30 min soak-in period after the pouch cells were fabricated, formation was initiated. The cell formation procedure consisted of several low rate charge/discharge cycles and included an elevated temperature exposure of several days while cells were fully charged. Following the elevated temperature exposure, cells were slit open, any excess electrolyte was drained out, and the cells were de-gassed and finally sealed in a vacuum tank sealer. After completing de-gas, cells were returned to the formation system to complete any remaining charge/discharge cycling.

When formation was completed, cells were released for subsequent electrochemical performance evaluation.

Example 7

Figure 9:
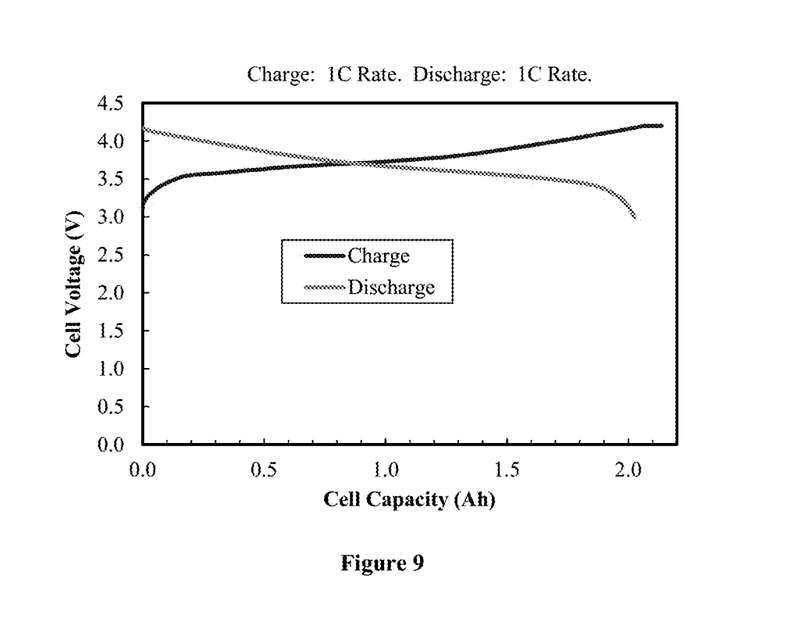
FIG. 9 is a charge/discharge profile obtained in Example 7 of a 2Ah pouch cell from Example 6 using pure ceramic nanowire membrane as separator.

Capacity of the 2Ah Pouch Cells Using Pure Ceramic Nanowire Membranes as Separators FIG. 9 shows a representative charge/discharge profile of the 2Ah pouch cells prepared from Example 6. The capacity of the pouch cell was measured to be 2.02Ah at 1C discharge rate.

Example 8

Figure 10:
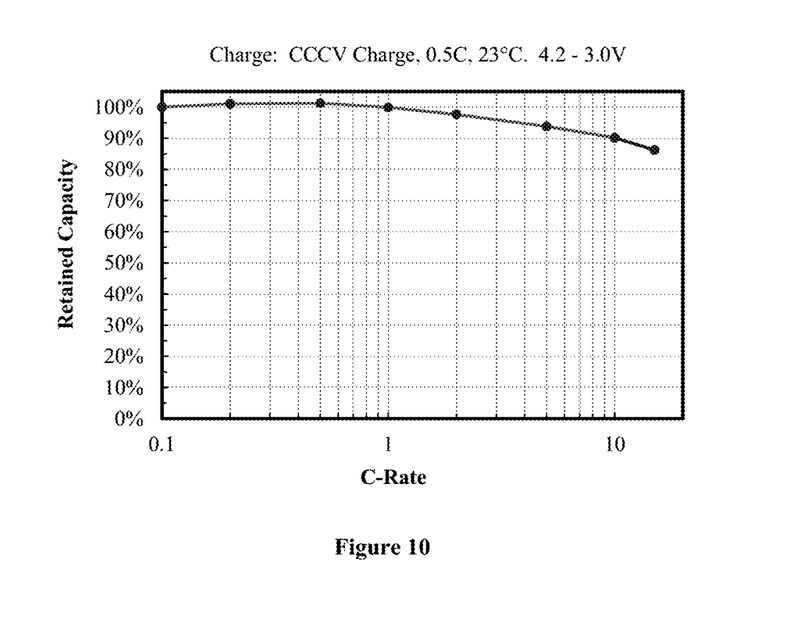
FIG. 10 shows the rate capability test result obtained in Example 8 of a 2Ah pouch cell from Example 6 using pure ceramic nanowire membrane as separator.

Rate Capability of the 2Ah Pouch Cells Using Pure Ceramic Nanowire Membranes as Separators Rate capability evaluation of the 2Ah pouch cells prepared from Example 6 was carried out. The rate capability evaluation procedure is as follows: Pouch cells were first fully charged at room temperature, and then fully discharged to $V_{min}$ (3.0V) at increasing rates. The discharge rates were 0.1C, 0.2C, 0.5C, 1C, 2C, 5C, 10C, and 15C. The pouch cells were tested using Maccor Series 4000 battery testers in Tenney TUJR and BTC environmental chambers. FIG. 10 shows the evaluation results. It shows that the 2Ah pouch cell using the ceramic nanowire membrane as separator exhibited excellent rate capability, retaining 90% and 86% of its capacity at high discharge rates of 10C and 15C, respectively.

Example 9

Cycle Life Test of the 2Ah Pouch Cells Using Pure Ceramic Nanowire Membranes as Separators The cycle performance of the 2Ah pouch cells prepared from Example 6 was evaluated at a charge/discharge rate of 1C between 4.2V and 3.0 V (100% DOD). The result is presented in FIG. 11 (labeled as pure NW separator). It revealed that the 2Ah pouch cell using the pure ceramic nanowire membrane as separator showed a stable charge/discharge behavior, which retains its 75% capacity after 1600 cycles.

Example 10

Figure 12:
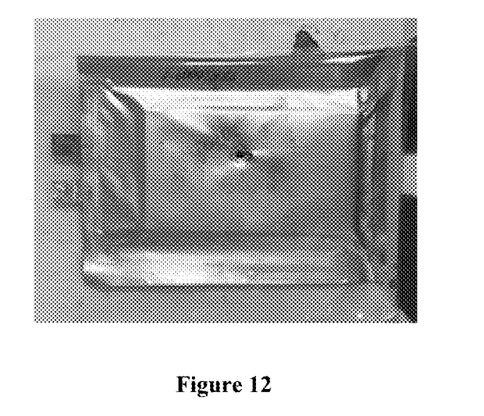
FIG. 12 is a photograph of a 2Ah pouch cell from Example 6 using pure ceramic nanowire membrane as separator after nail penetration test (Example 10).

Nail Penetration Test of the 2Ah Pouch Cells Using Pure Ceramic Nanowire Membranes as Separators Nail penetration test was carried out on the 2Ah pouch cells prepared from Example 6. The pouch cells were fully charged to 4.2V before the nail penetration test. The nail penetration test was carried out in a battery abuse test chamber. A 3 mm diameter steel nail was used for the penetration. The nail penetration process was controlled by a machine and performed automatically. An in-situ video recording was used to record the test process. The test results showed that the 2Ah pouch cells using the pure ceramic nanowire membranes as separators only released a traceable amount of gas during the nail penetration test. The pouch cells showed no dramatic change after the nail penetration test, as shown in FIG. 12.

Example 11

The Fabrication of 2Ah Pouch Cells Using Ceramic Nanowire-Cellulose Nanofiber Membranes as Separators 2Ah pouch cells were fabricated according to the procedure in Example 6 except that the ceramic nanowire-cellulose nanofiber membranes prepared in Example 3 was used as battery separator.

Example 12

Cycle Life Test of the 2Ah Pouch Cells Using Ceramic Nanowire-Cellulose Nanofiber Membranes as Separators The cycle life performance of the 2Ah pouch cells prepared from Example 11 was evaluated at a charge/discharge rate of 1C between 4.2V and 3.0 V (100% DOD). The result is presented in FIG. 11 (labeled as NW-CNF separator). It revealed that the 2Ah pouch cell using the ceramic nanowire-cellulose nanofiber membrane as separator showed a superior stable charge/discharge behavior in 2000 cycles, which retains its 80% capacity after 2000 cycles.

Example 13

Figure 13:
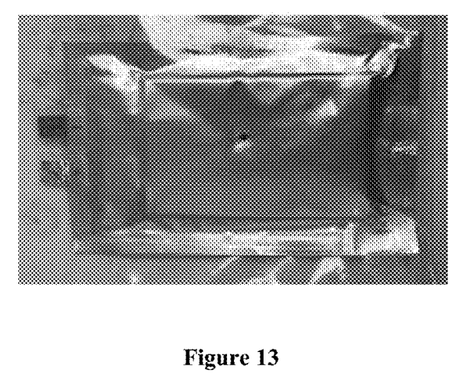
FIG. 13 is a photograph of a 2Ah pouch cell from Example 11 using ceramic nanowire-cellulose nanofiber membrane as separator after nail penetration test (Example 13).

Nail Penetration Test of the 2Ah Pouch Cells Using Ceramic Nanowire-Cellulose Nanofiber Membranes as Separators Nail penetration test was carried out on the 2Ah pouch cells prepared from Example 11. The pouch cells were fully charged to 4.2V before the nail penetration test. The nail penetration test was carried out in a battery abuse test chamber. A 3 mm diameter steel nail was used for the penetration. The nail penetration process was controlled by a machine and performed automatically. An in-situ video recording was used to record the test process. The test results showed that the 2Ah pouch cells using ceramic nanowire-cellulose nanofiber membranes as separators only released a traceable amount of gas during the nail penetration test. The pouch cell showed no dramatic change after the nail penetration test, as shown in FIG. 13.

Comparative Example 1

The Fabrication of 2Ah Pouch Cells Using Celgard 2325 Membranes as Separators

2Ah pouch cells were fabricated according the procedure in Example 6 with the exception that the commercial Celgard 2325 polymeric separator was used as battery separator, and the packaged cell was vacuum dried at 80° C. for min. 24 h, because polymeric separator can not be dried at higher temperature.

Comparative Example 2

Figure 11:
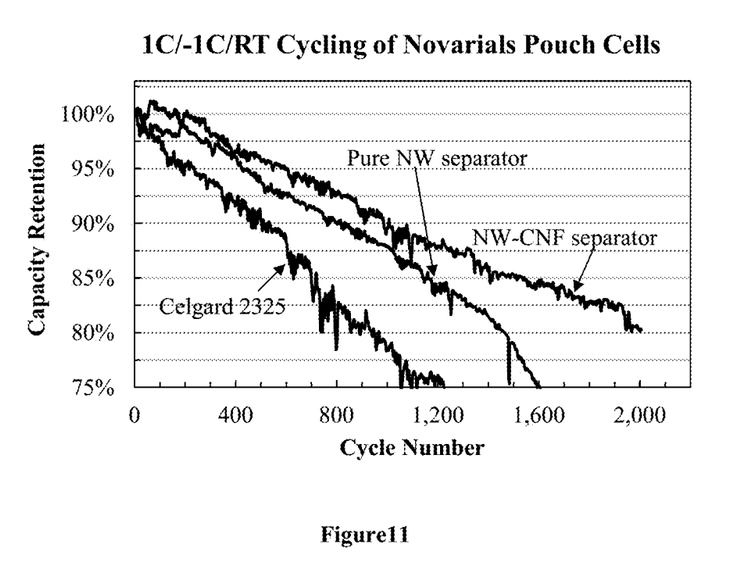
FIG. 11 shows the cycle life test results of a 2Ah pouch cell using Celgard 2325 battery separator (labeled as Celgard 2325) from Comparative Example 2, a 2Ah pouch cell using pure ceramic nanowire membrane as separator (labeled as Pure NW separator) from Example 9, and a 2Ah pouch cell using ceramic nanowire-cellulose nanofiber separator (labeled as NW-CNF separator) from Example 12.

Cycle Life Test of the 2Ah Pouch Cells Using Celgard 2325 Membranes as Separators The cycle performance of the 2Ah pouch cells prepared from Comparative Example 1 was evaluated at a charge/discharge rate of 1C between 4.2V and 3.0 V (100% DOD), as is presented in FIG. 11 (labeled as Celgard 2325). It revealed that the 2Ah pouch cell using the Celgard 2325 membrane as separator only retains its 75% capacity after 1200 cycles.

Comparative Example 3

Nail Penetration Test of the 2Ah Pouch Cells Using Celgard 2325 as Separators

Figure 14:
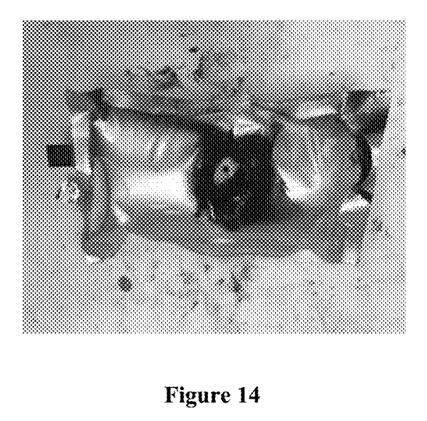
FIG. 14 is a photograph of a 2Ah pouch cell from Comparative Example 1 using Celgard as separator after nail penetration test (Comparative Example 3).

The nail penetration test was carried out on the 2Ah pouch cells prepared from Comparative Example 1. The test results showed that the 2Ah pouch cells using Celgard 2325 as separators immediately released a large amount of vapor and black fume after the nail penetration, indicating quick release of electrolyte and electrode materials. Burn marks were observed on the 2Ah pouch cells after the nail penetration test, as shown in FIG. 14.

INDUSTRIAL APPLICABILITY

The industry application of the invented ceramic nanowire battery separator is wide. Hybrid electric vehicles (HEVs), plug-in hybrid electric vehicles (PHEVs), electric vehicles (EVs), are continuing to gain acceptance. Globally, automakers have introduced a broad range of electric vehicles. The global demand for high performance separators used in lithium-ion batteries (LIBs) is expected to grow in the coming years, and will reach $8.0 billion in 2027, mainly driven by the demand for various electric vehicles. Light, compact, high power and high capacity lithium-ion batteries provide the most attractive solution for powering these electric vehicles. The safety issue and long cycle life of large format lithium-ion battery for auto industry continues to be a major concern for customer acceptance. Lithium-ion batteries must be well designed, engineered and manufactured for xEV applications, and any known risk factors have to be reduced to an insignificant level. Structural integrity of a separator at elevated temperature and in oxidation environment for a long time is highly required for the safe and longtime operation of a lithium-ion battery for xEVs. In addition to this battery need from automotive industry, the rising demand for electricity has led to an increasing demand for more efficient grid battery systems that can handle intermittent power generated by renewable sources such as solar and wind. The grid scale battery storage market is a fledging and vibrant market with vast potential for future growth. Lithium-ion batteries with high safety and long-term stability are also considered as a good choice for this grid storage.

The invention claimed is:

1. A rechargeable battery comprising:
   an anode;
   a cathode; and
   a battery separator disposed between the anode and the cathode, wherein the battery separator comprises dihydroxyaluminum sodium carbonate nanowires.

2. The rechargeable battery of claim 1, wherein the battery separator further comprises one or more organic polymer binders.

3. The rechargeable battery of claim 1, wherein the battery separator further comprises cellulose nanofibers.

4. The rechargeable battery of claim 1, wherein the nanowires are prepared by a hydrothermal growth process.

5. The rechargeable battery of claim 1, wherein the nanowires have a diameter of from about 10 nanometers to about 500 nanometers and a length of longer than 5 microns.

6. The rechargeable battery of claim 2, wherein the polymer binder is one of polyvinyl alcohol, polyvinylpyrrolidone, or poly(acrylic acid-co-maleic acid) binder.

7. The rechargeable battery of claim 3, wherein the cellulose nanofibers have a diameter of from about 10 nanometers to about 500 nanometers and a length of longer than 5 microns.

8. The rechargeable battery of claim 2, wherein the weight percentage of the polymer binder in the battery separator is less than 50%.

9. The rechargeable battery of claim 3, wherein the weight percentage of the cellulose nanofibers in the battery separator is less than 50%.

10. The rechargeable battery of claim 1, wherein the battery separator has a thickness of from about 3 microns to about 30 microns.

11. The rechargeable battery of claim 1, wherein the battery separator has a porosity of from about 45% to about 85%.

12. The rechargeable battery of claim 1, wherein the battery separator is flexible.

13. A method for preparing the battery separator of the rechargeable battery of claim 1 comprising the steps of:
    a. processing a nanowire slurry using a three-roll mill to a uniform dispersion,
    b. preparing an aqueous dispersion of the milled nanowires,
    c. wet laying the milled nanowires onto a porous support by filtration,
    d. drying the formed wet nanowire membrane with the support layer, and
    e. releasing the dry nanowire membrane from the support layer as a free-standing membrane.

14. The method of claim 13, wherein the polymer binder is added to the nanowire suspension at step b, and the other steps are continued.

15. The method of claim 13, wherein the cellulose nanofibers are added to the nanowire suspension of step b, and the other steps are continued.

16. A method for preparing a battery separator of a rechargeable battery, the method comprising:
    processing a nanowire slurry comprising dihydroxyaluminum sodium carbonate nanowires and water, including preparing the nanowires by a hydrothermal growth process;
    wherein the hydrothermal growth process comprises:
        adding deionized water, sodium bicarbonate and sodium hydroxide to a blender and blended to form a solution;
        adding sodium hydroxide to the solution to adjust the pH of the solution to be in a range from 10 to 11;
        adding aluminum isopropoxide and blended to form a slurry;
        transferring the slurry into a pressure vessel;
        heating the pressure vessel to an elevated temperature for 12 to 96 hours; and
        cooling the pressure vessel to room temperature, and producing the dihydroxyaluminum sodium carbonate nanowires;
    wherein the nanowire slurry is prepared by milling the dihydroxyaluminum sodium carbonate nanowires and water through a three roll mill.

17. The battery separator of claim 2 having a thickness in a range from about 3 microns to about 30 microns.

18. A battery separator comprising dihydroxyaluminum sodium carbonate nanowires and one or more organic polymer binders.

19. The battery separator of claim 18, wherein the nanowires are prepared by a hydrothermal growth process.

20. The battery separator of claim 18, further comprising cellulose nanofibers.

\* \* \* \* \*